United States Patent
Mathai et al.

(10) Patent No.: US 10,459,174 B2
(45) Date of Patent: Oct. 29, 2019

(54) BONDED FILTER SUBSTRATES

(71) Applicant: HEWLETT PACKARD ENTERPRISE DEVELOPMENT LP, Houston, TX (US)

(72) Inventors: Sagi Varghese Mathai, Sunnyvale, CA (US); Georgios Panotopoulos, Menlo Park, CA (US); Michael Renne Ty Tan, Menlo Park, CA (US); Paul K Rosenberg, Sunnyvale, CA (US); Wayne V Sorin, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/536,130

(22) PCT Filed: Dec. 19, 2014

(86) PCT No.: PCT/US2014/071367
§ 371 (c)(1),
(2) Date: Jun. 14, 2017

(87) PCT Pub. No.: WO2016/099531
PCT Pub. Date: Jun. 23, 2016

(65) Prior Publication Data
US 2017/0351041 A1    Dec. 7, 2017

(51) Int. Cl.
*G02B 6/32* (2006.01)
*G02B 6/42* (2006.01)

(52) U.S. Cl.
CPC ......... *G02B 6/4206* (2013.01); *G02B 6/4214* (2013.01); *G02B 6/4215* (2013.01); *G02B 6/4249* (2013.01)

(58) Field of Classification Search
CPC .... G02B 6/4214; G02B 6/4215; G02B 6/425; G02B 6/29308; G02B 6/2931; G02B 6/29365; G02B 6/29367; G02B 6/4228
(Continued)

(56) References Cited

U.S. PATENT DOCUMENTS 6,563,976 B1 * 5/2003 Grann ................ G02B 6/29311
                                                                    385/24
6,684,010 B1    1/2004 Morris, Jr. et al.
(Continued)

OTHER PUBLICATIONS

Cisco ONS 15454 Engineering Planning Guide [online], Retrieved from the Internet on Oct. 12, 2014, Nov. 2009, Figure C-19 Waveguide Grating Diffraction, p. C-16, 22 pages. <http://www.cisco.com/c/en/us/td/docs/optical/15000r5_0/planning/guide/r50engpl/r50appc.

(Continued)

*Primary Examiner* — Kaveh C Kianni
*Assistant Examiner* — Hung Q Lam
(74) *Attorney, Agent, or Firm* — Hewlett Packard Enterprise Patent Department

(57) ABSTRACT

In the examples provided herein, an apparatus has a first substrate upon which one or more first filters have been fabricated on a first surface of the first substrate. The apparatus also has a second substrate upon which one or more second filters have been fabricated on a second surface of the second substrate, wherein the one or more first filters and the one or more second filters each transmit a different band of wavelengths. Additionally, the apparatus has a bonding material that bonds the first substrate to the second substrate.

5 Claims, 14 Drawing Sheets

(58) Field of Classification Search
USPC ..... 385/14, 18, 24, 31, 33, 37, 47, 130, 131
See application file for complete search history.

(56) References Cited

U.S. PATENT DOCUMENTS

| | | |
|---|---|---|
| 7,574,078 B2 | 8/2009 | Wagener et al. |
| 7,616,845 B2 | 11/2009 | Matsuoka et al. |
| 8,532,445 B2 | 9/2013 | Morris et al. |
| 8,537,468 B1 | 9/2013 | Wang et al. |
| 2004/0033014 A1* | 2/2004 | Sasaki ................ G02B 6/29367 385/24 |
| 2004/0165828 A1 | 8/2004 | Capewell et al. |
| 2006/0078252 A1 | 4/2006 | Panotopoulos |
| 2008/0285914 A1* | 11/2008 | Matsuoka .......... G02B 6/12007 385/24 |
| 2009/0142060 A1* | 6/2009 | Strasser ............. G02B 6/29367 398/68 |
| 2011/0033152 A1 | 2/2011 | Morris et al. |
| 2011/0244630 A1 | 10/2011 | Martin et al. |

OTHER PUBLICATIONS

International Search Report & Written Opinion received in PCT Application No. PCT/US2014/071367, dated Aug. 27, 2015, 12 pages.

\* cited by examiner

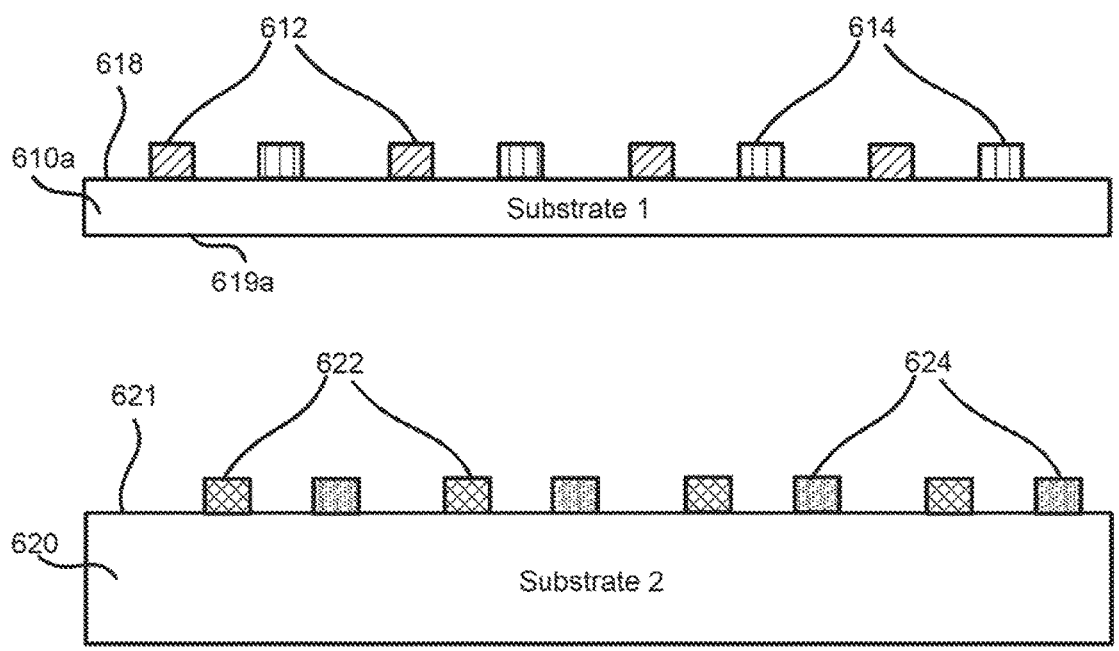
FIG. 6C1
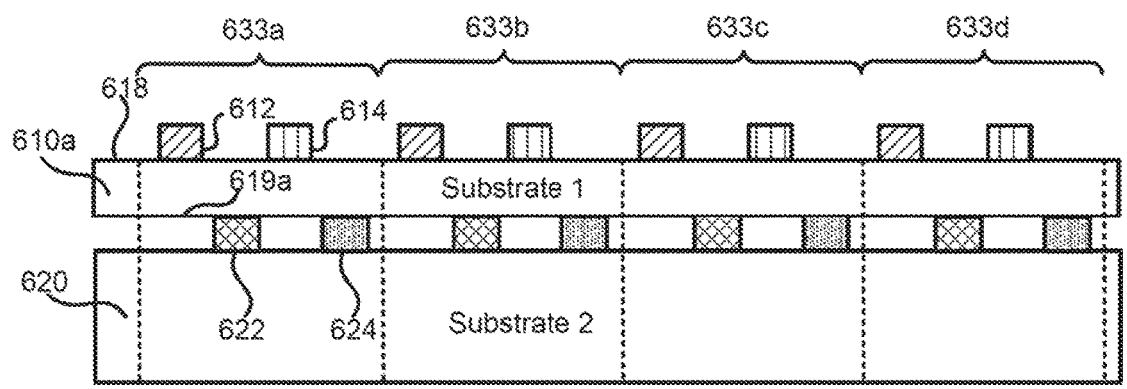
FIG. 6C2

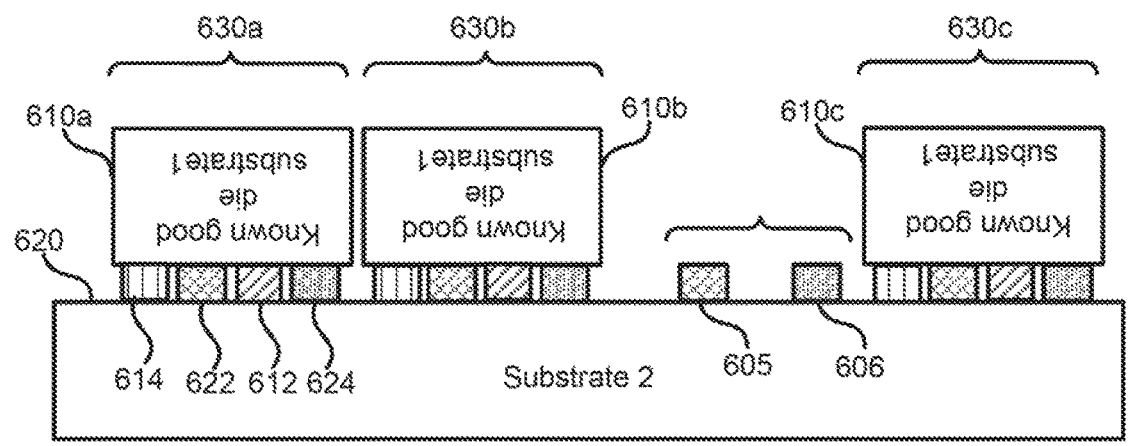
FIG. 6D1
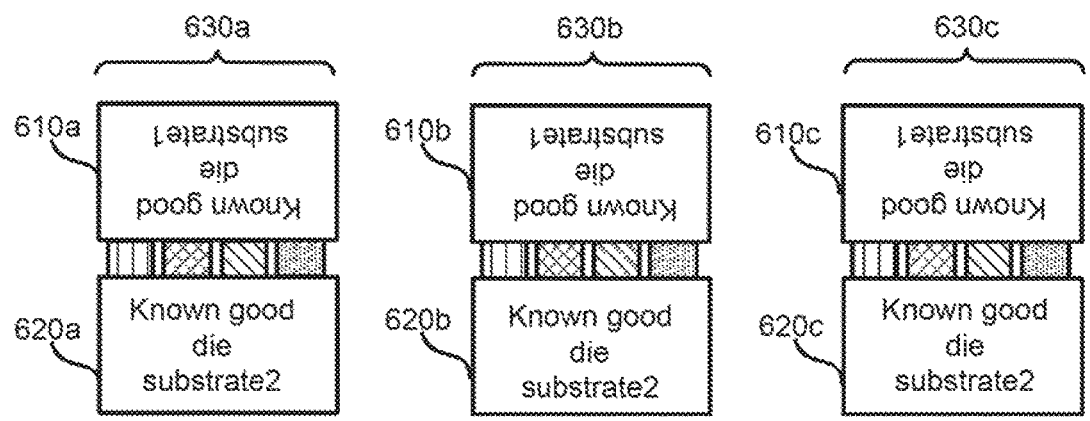
FIG. 6D2

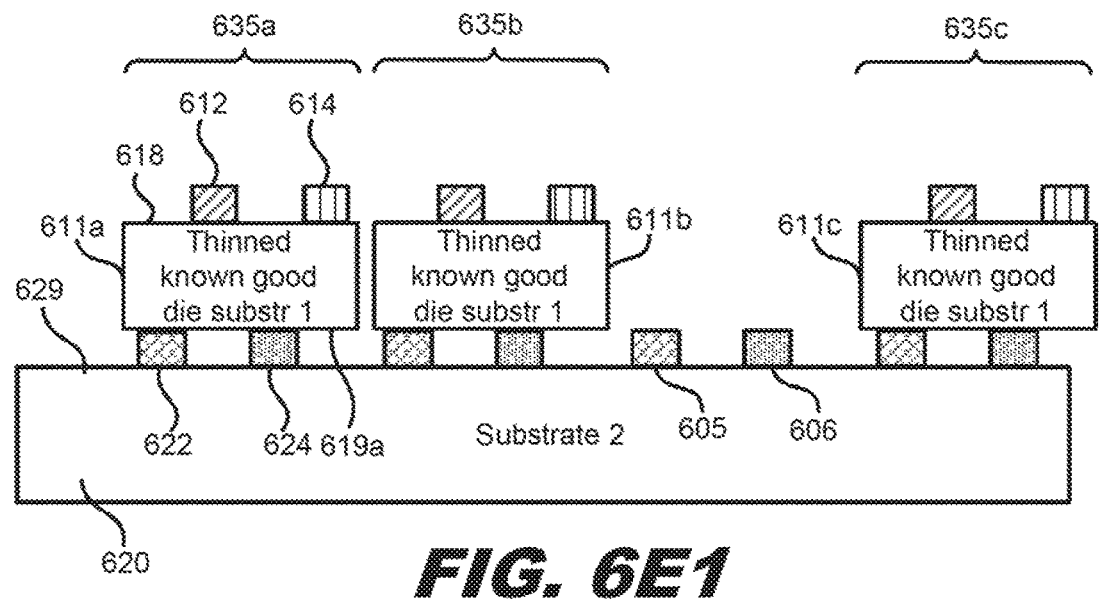
FIG. 6E1
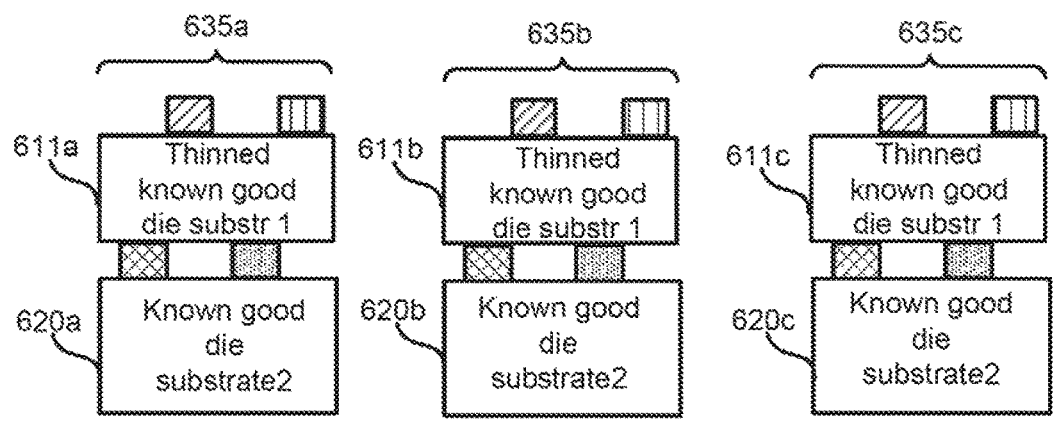
FIG. 6E2

700

Fabricate a plurality of first filters and a plurality of second filters on a first surface of a first wafer, where the plurality of first filters each transmit a first group of wavelengths, and the plurality of second filters each transmit a second group of wavelengths
705

Fabricate a plurality of third filters and a plurality of fourth filters on a second surface of a second wafer, where the plurality of third filters each transmit a third group of wavelengths, and the plurality of fourth filters each transmit a fourth group of wavelengths, and further where the first group of wavelengths, the second group of wavelengths, the third group of wavelengths, and the fourth group of wavelengths are different
710

Bond the first wafer to the second wafer
715

Dice the bonded first wafer and second wafer into sections that include one first filter, one second filter, one third filter, and one fourth filter
720

Fabricate a plurality of first filters and a plurality of second filters on a first surface of a first wafer, wherein the plurality of first filters each transmit a first group of wavelengths, and the plurality of second filters each transmit a second group of wavelengths
905

Fabricate a plurality of third filters and a plurality of fourth filters on a second surface of a second wafer, wherein the plurality of third filters each transmit a third group of wavelengths, and the plurality of fourth filters each transmit a fourth group of wavelengths, and further wherein the first group of wavelengths, the second group of wavelengths, the third group of wavelengths, and the fourth group of wavelengths are different
910

Determine which of the plurality of first filters, the plurality of second filters, the plurality of third filters, and the plurality of fourth filters meet specifications
915

Dice the first wafer to produce first sections that include one first filter and one second filter that meet specifications
920

*FIG. 9A*

BONDED FILTER SUBSTRATES

BACKGROUND

Wavelength division multiplexing (WDM) is useful for increasing communication bandwidth by sending multiple data channels down a single fiber. For example, a 100 gigabit per second (Gbps) link can be constructed by using four channels operating at 25 Gbps per channel, with each channel operating at a different wavelength. A multiplexer is used to join the signals together before transmitting them down the waveguide, and a demultiplexer is subsequently used to separate the signals.

BRIEF DESCRIPTION OF THE DRAWINGS

The accompanying drawings illustrate various examples of the principles described below. The examples and drawings are illustrative rather than limiting.

FIGS. 6A, 6B, 6C1, 6C2, 6D1, 6D2, 6E1, and 6E2 depict steps of different fabrication techniques for fabricating bonded filter substrates.

FIG. 7 depicts a flow diagram illustrating an example process of fabricating bonded filter substrates having four different types of filters, where the substrates are bonded prior to dicing the substrates.

FIGS. 9A-9B depict a flow diagram illustrating an example process of fabricating bonded filter substrates having four different types of filters, where the filters are tested prior to bonding the substrates.

DETAILED DESCRIPTION

In a WDM optical system, optical signals from two or more sources are multiplexed together for transmission down an optical waveguide. Each optical signal has a different peak wavelength. After traveling through the waveguide, the signals are separated. By multiplexing multiple signals on a single waveguide, the transmission capacity of the waveguide can be increased.

In some WDM system configurations, multiple wavelength-selective optical filters having different passbands can be used to multiplex and demultiplex optical signals. The different optical filters for a WDM system can be fabricated as a monolithic filter array. However, the aggregate yield for a monolithic filter array with multiple different optical filters can be low. The techniques presented below enable manufacturing of filter arrays with a higher aggregate yield. In one configuration, the assembly of a filter array that has multiple different wavelength-selective filters includes a first substrate upon which one or more first filters have been fabricated on a first surface of the first substrate, and a second substrate upon which one or more second filters have been fabricated on a second surface of the second substrate. The one or more first filters and the one or more second filters each transmit a different band of wavelengths. Further, a bonding material bonds the first substrate to the second substrate.

WDM Optical System

Figure 1:
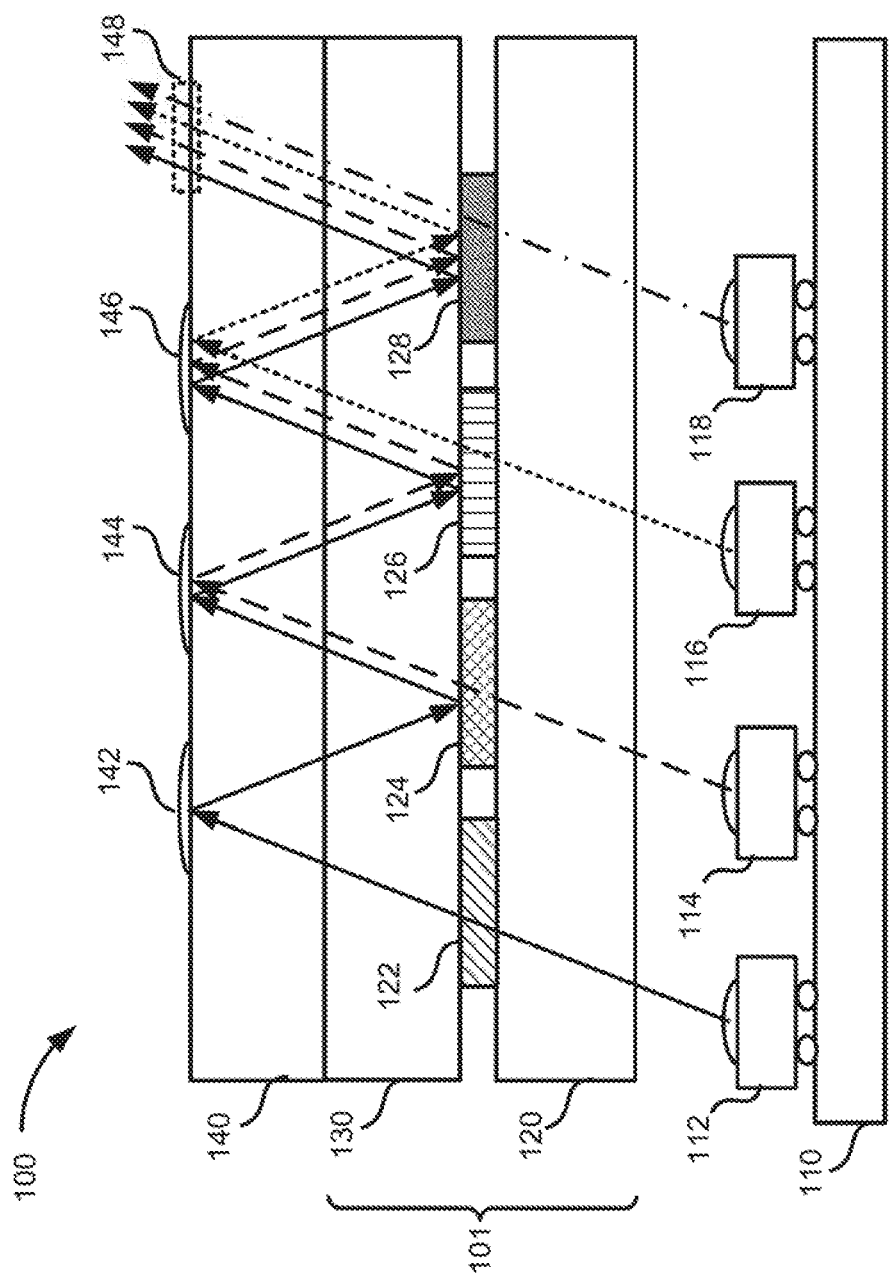
FIG. 1 depicts a block diagram of an example multiplexer system that includes four wavelength-selective filters fabricated on two different substrates, and the substrates are bonded together such that the filters are positioned between the substrates.

FIG. 1 depicts a block diagram of an example system 100 that includes multiple different wavelength-selective filters 122, 124, 126, 128 fabricated on two substrates 120, 130, where the substrates 120, 130 are bonded together, and the wavelength-selective filters 122, 124, 126, 128 are positioned between the substrates 120, 130 that form a filter array 101. Multiple optical sources 112, 114, 116, 118 can each emit a light beam carrying data, and the light beams are multiplexed by the system 100. The optical sources 112, 114, 116, 118 can be any type of light source that emits a light beam in a band of wavelengths, such as a vertical-cavity surface-emitting laser (VCSEL), a distributed feedback laser, or a fiber laser. The optical sources may include lenses to tilt and collimate the light beams. Substrates 120, 130 can transmit a high percentage of the wavelengths of the light emitted by the optical sources 112, 114, 116, 118. In the example of FIG. 1, four optical sources 112, 114, 116, 118 are shown, but the light emitted by any number of optical sources can be multiplexed with an appropriate system similar to system 100, for example, having a one-to-one correspondence between the number of optical sources and the number of wavelength-selective filters.

The optical sources 112, 114, 116, 118 can be positioned so that each emitted light beam is received at a different wavelength-selective filter 122, 124, 126, 128, and the wavelength-selective filters 122, 124, 126, 128 can be positioned in a row. Each wavelength-selective filter 122, 124, 126, 128 can reflect light at a first set or group of wavelengths and transmits light at a second set or group of wavelengths. The first set of wavelengths is different from the second set of wavelengths for a given wavelength-selective filter, and each wavelength-selective filter 122, 124, 126, 128 transmits a different second set of wavelengths. For example, the set of wavelengths emitted by optical source 112 that is transmitted by wavelength-selective filter 122 is different from the set of wavelengths emitted by optical source 114 that is transmitted by wavelength-selective filter 124 and is also different from the set of wavelengths emitted by optical source 116 that is transmitted by wavelength-selective filter 126, and yet further, is different from the set of wavelengths emitted by optical source 118 that is transmitted by wavelength-selective filter 128. Also, the set of wavelengths emitted by a particular optical source 112, 114, 116, 118 is reflected by each of the wavelength-selective filters 122, 124, 126, 128 that do not transmit that particular set of emitted wavelengths. For example, the set of wavelengths emitted by optical source 112 is reflected by each of the wavelength-selective filters 124, 126, 128.

Additionally, in the system 100, the light beams from the three optical sources 112, 114, 116 can be focused and reflected by relay mirrors 142, 144, 146 toward the next successive wavelength-selective filter in the row of wavelength-selective filters. The relay mirrors 142, 144, 146 are coupled to substrate 140 which can transmit a high percentage of light at the wavelengths emitted by the optical sources 112, 114, 116, 118. Thus, in example system 100, the light beam emitted by optical source 112 is first transmitted by substrate 120 and then transmitted by wavelength-selective filter 122, focused and reflected by relay mirror 142, reflected by wavelength-selective filter 124, focused and reflected by relay mirror 144, reflected by wavelength-selective filter 126, focused and reflected by relay mirror 146, reflected by wavelength-selective filter 128 and finally exits the system 100 at output location 148. In some implementations, an output lens can be placed at output location 148 to tilt, focus, or collimate the exiting light. Note that as a light beam bounces between the relay mirrors 142, 144, 146 and the wavelength-selective filters 124, 126, 128 before exiting the system 100, the light beam travels with low loss multiple times through substrates 130, 140. The light beams emitted by the other optical sources 114, 116, 118 can bounce between the appropriate relay mirrors and wavelengths-selective filters in a similar manner until exiting from system 100 at output location 148. Thus, the light exiting system 100 at output location 148 can include multiplexed light beams from each of the optical sources 112, 114, 116, 118. In some instances, substrates 130, 140 may be a single substrate.

A similar system can also perform a demultiplexing function if a multiplexed light beam enters system 100 from the output location 148 and travels through the system 100 in the opposite direction from the light beams in the multiplexing configuration described above. Additionally, for the demultiplexing configuration, four photodetectors can be used, one photodetector is positioned where each of the optical sources 112, 114, 116, 118 are located. The photodetectors may include lenses to focus the incoming light beams onto the light absorbing areas of the photodetectors. For example, light having wavelengths in the set of wavelengths transmitted by wavelength-selective filter 122 is reflected by filter 128, focused and reflected by relay mirror 146, reflected by filter 126, focused and reflected by relay mirror 144, reflected by filter 124, focused and reflected by relay mirror 142, and transmitted by filter 122 to a photodetector. Thus, in this example, a multiplexed light beam can be separated into light beams having different wavelengths for detection by different photodetectors, in this case, four photodetectors. However, a light beam can be demultiplexed into any number of light beams with different wavelengths with an appropriate number of wavelength-selective filters and photodetectors.

Returning to the multiplexing configuration shown in FIG. 1, in general, the emission wavelength spectrum of each of the optical sources 112, 114, 116, 118 can be matched to the passband transmission wavelengths of the corresponding wavelength-selective filter 122, 124, 126, 128 to minimize optical power loss in the system 100. Wavelength-selective filters 122, 124, 126, 128 can be made of multiple layers of thin film dielectric material having different refractive indices.

Generally, the yield for each fabricated wavelength-selective filter that meets filter specifications is not 100%, and, in fact, can be substantially lower than 100%. As a result, the greater the number of different filters that are formed on the same substrate of a filter array, the lower the total yield. The total yield can be so low that it may not be practical to manufacture the filter array at a reasonable cost. In the example system 100 shown in FIG. 1, four different wavelength-selective filters are used in the filter array 101. Techniques are presented below that improve the yield of the filter array 101 by limiting the number of filters fabricated on a given substrate or wafer.

Figure 2:
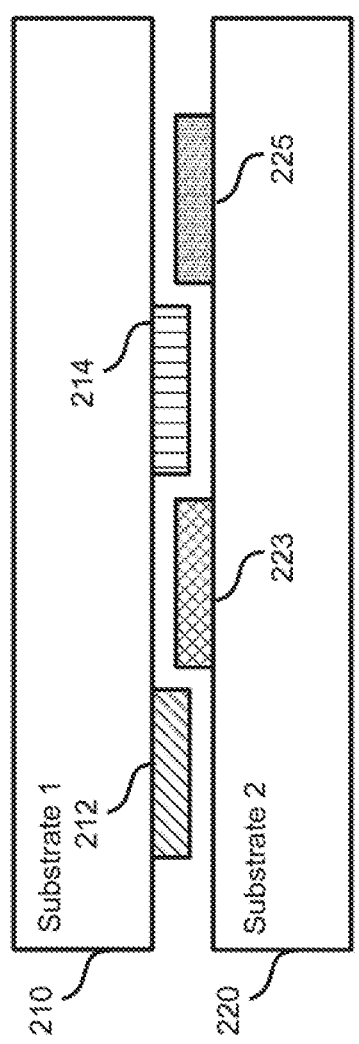
FIG. 2 depicts example filter die substrates.

In one implementation, a plurality of first filters and a plurality of second filters can be fabricated on a first substrate, and a plurality of third filters and a plurality of fourth filters can be fabricated on a second substrate. FIG. 2 depicts two example die substrates, substrate 1 210 and substrate 2 220, which were diced from a larger first substrate and a larger second substrate, respectively. One first filter 212 and one second filter 214 are fabricated on substrate 1 210, and one third filter 223 and one fourth filter 225 are fabricated on substrate 2 220. In this example, two filters are fabricated, and then the two substrates, each having two good filters, are bonded together. However, any number of filters can be fabricated on each of two or more substrates that are subsequently bonded together. The die substrates 210, 220 can be any type of material, such as silicon, glass, ceramic, or organic materials.

When the substrates are bonded together, the substrates should be maintained as parallel as possible. Referring to FIG. 1, if the substrates 120, 130 are not parallel or close to being parallel, the light beams emitted by the optical sources 112, 114, 116, 118 may not be reflected at the correct angles from the wavelength-selective filters 124, 126, 128 or from the relay mirrors 142, 144, 146. As a result the light beams may not be directed toward the output location 148 of system 100.

There are two cases for bonding together the substrates 120, 130 if the filters 122, 124, 126, 128 are positioned between the two substrates 120, 130, as shown in the example of FIG. 1. In the first case, the filters have equal thicknesses, and in the second case, the filters have dissimilar thicknesses.

Equal Filter Thicknesses

Figure 3:
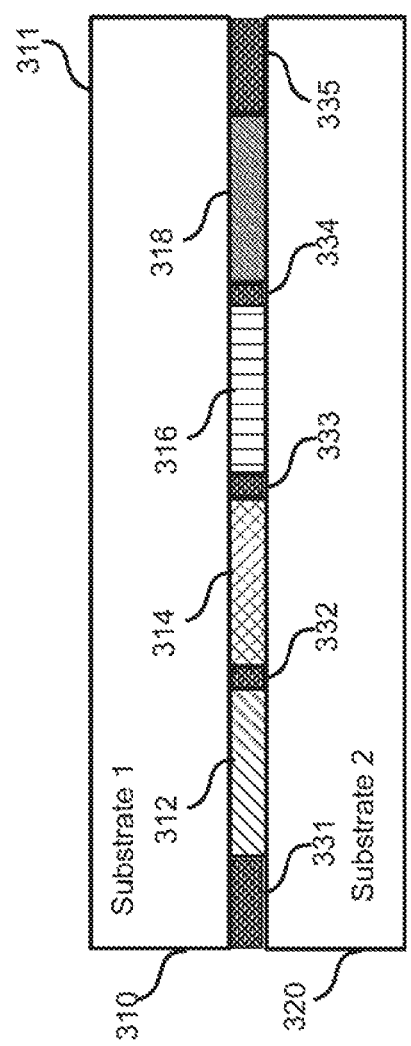
FIG. 3 depicts an example of bonded filter substrates where the filters fabricated on the substrates have equal thicknesses.

FIG. 3 depicts an example of bonded filter substrates 310, 320 where the filters 312, 316 fabricated on a first substrate 310 and the filters 314, 318 fabricated on a second substrate 320 have equal thicknesses. The substrates 310, 320 should both be sufficiently flat so that the substrates 310, 320 can be brought into intimate contact and bonded. Methods of bonding the substrates 310, 320 will be described below.

When filters are fabricated on a substrate, the substrate might bow due to thin film stresses. To mitigate bowing of the substrate, coatings can be placed on the opposite surface of the substrate from the surface where the filters are fabricated so that the material of the coatings compensates for the stress induced by the filters and flattens the substrate. Alternatively or additionally, the substrate can be pre-bowed in the opposite direction by grinding and/or polishing the substrate so that deposition of the filters on the pre-bowed substrate results in flattening of the substrate; and/or a coefficient of thermal expansion of the first substrate, the second substrate, and thin films used to create the filters 312, 314, 316, 318 can be matched. These techniques can be applied to at least one of the first substrate 310 and the second substrate 320, or to both substrates 310, 320.

To reduce potential crosstalk of light beams and absorb any stray light that might be reflected off a filter or substrate at an undesired angle, absorbing bonding material 331, 332, 333, 334, 335 can be positioned between the first substrate 310 and the second substrate 320 in areas not occupied by one of the filters 312, 314, 316, 318.

Dissimilar Filter Thicknesses

Figure 4:
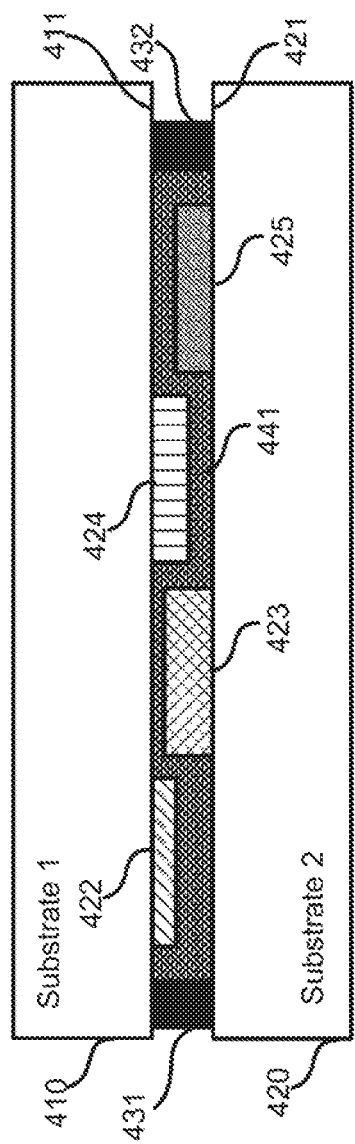
FIG. 4 depicts an example of bonded filter substrates where the filters fabricated on the substrates have dissimilar filter thicknesses.

FIG. 4 depicts an example of bonded filter substrates 410, 420 where the filters 422, 424 fabricated on a first substrate 410 and the filters 423, 425 fabricated on a second substrate 420 have dissimilar filter thicknesses. A plurality of standoffs 431, 432 can be fabricated on one or both of the substrates 410, 420 and positioned between the first substrate 410 and the second substrate 420 to maintain a fixed separation between the first substrate 410 and the second substrate 420. For example, the standoffs 431, 432 can be fabricated using a glass material, metal, deposited thin films, or electroplated materials, or the substrates 410, 420 can be etched to form a recess in which the filters 422, 423, 424, 425 are fabricated. Another method is to insert shims between the substrates 410, 420.

Yet another method is to use two-sided tape, epoxy film, or patternable material, such as photoresist, BCB (benzocyclobutene), polyimide, or SU8 epoxy polymer, as the bonding material. Multiple apertures, one corresponding to each of the filters, can be created in the bonding material, and each filter 422, 423, 424, 425 can be positioned in a different one of the apertures between the first substrate 410 and the second substrate 420. Although four filters are shown in the example of FIG. 4, more or fewer filters can be used.

As with the case of equal thickness filters (FIG. 3), for dissimilar filter thicknesses, bonding material 441 can be positioned between the first substrate 410 and the second substrate 420 in areas not occupied by one of the filters 422, 423, 424, 425, where the bonding material absorbs incident light.

In areas corresponding to the filter apertures, the first surface 411 of the first substrate 410 on which the filters 422, 424 are fabricated and a second surface 421 of the second substrate 420 on which the filters 423, 425 are fabricated can be coated with an anti-reflection coating (not shown) to minimize reflections at the air-substrate interfaces. As another alternative, the bonding material 441 can be selected to be index-matched to a refractive index of the first substrate 410 and the second substrate 420.

Figure 5:
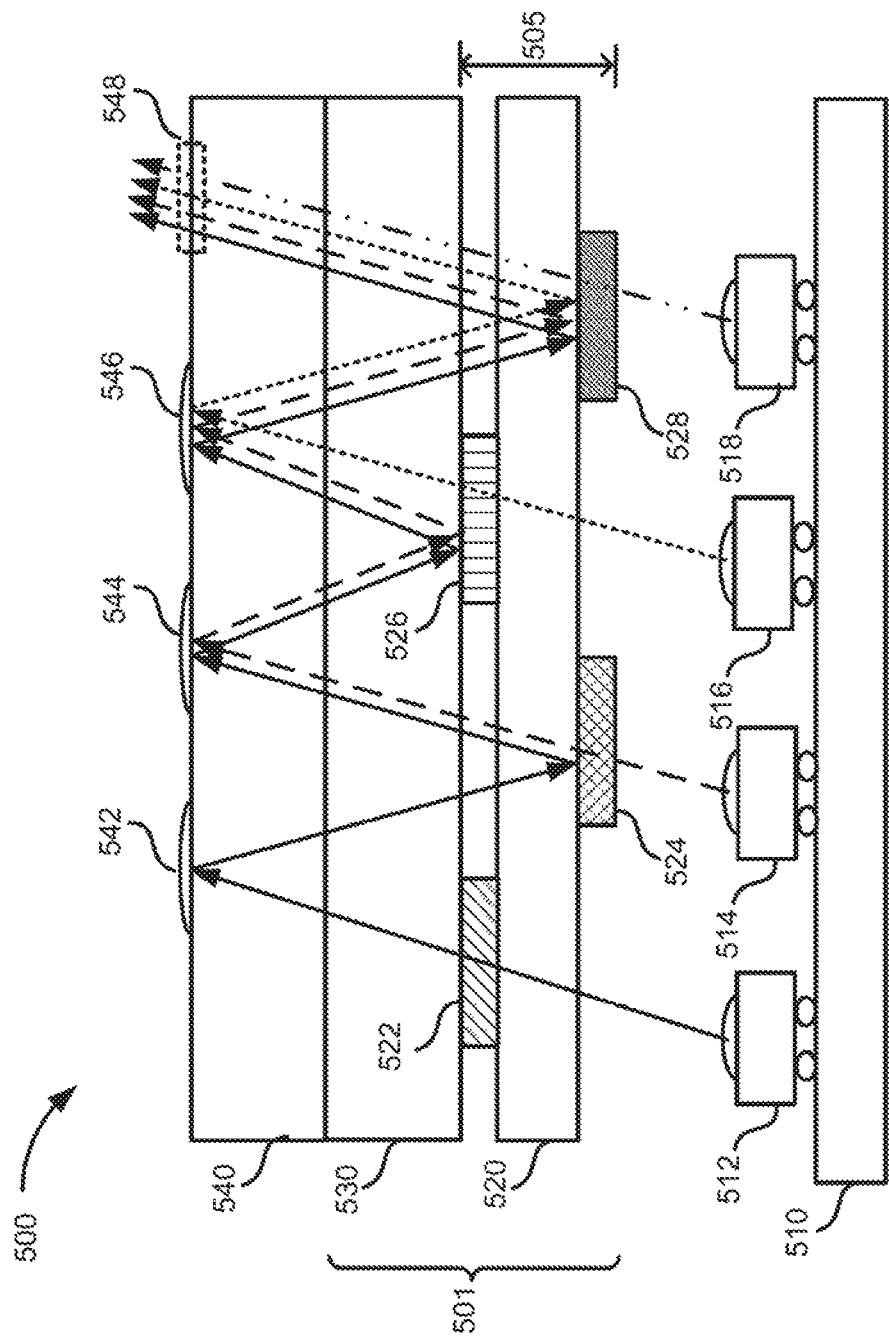
FIG. 5 depicts a block diagram of an example multiplexer system that includes four wavelength-selective filters fabricated on two different substrates, and the substrates are bonded together such that two of the filters are not positioned between the substrates.

FIG. 5 depicts a block diagram of an example system 500 that includes a series of four wavelength-selective filters 522, 524, 526, 528 fabricated on two different substrates 520, 530, where the substrates 520, 530 are bonded such that two of the filters 524, 528 not located between the substrates. That is, in contrast to system 100 in FIG. 1 where all of the optical filters 122, 124, 126, 128 are co-planar, in system 500, optical filters 522, 526 are not co-planar with optical filters 524, 528. Specifically, filters 522 and 526 have been fabricated on substrate 530, and filters 524, 528 have been fabricated on substrate 520, and the filters 524, 528 are not positioned between the substrates 520, 530. The substrates 520, 530 and filters 522, 524, 526, 528 form a filter array 501.

In some configurations, such as in system 100 of FIG. 1, the distance between a relay mirror 142, 144, 146 and the filters closest to each relay mirror can be designed to be approximately a Rayleigh range, such that the relay mirror performs one-to-one imaging of the light beams between those filter locations. For the system 500 in FIG. 5, the distances between the filters closest to a relay mirror and the relay mirror is not the same, for example the distance between filter 522 and relay mirror 542 is less than the distance between relay mirror 542 and filter 524. To approximately maintain the one-to-one imaging of the light beams between filter locations by the relay mirrors, the distance 505 should be small relative to the Rayleigh range. Because filters are fabricated on a thick substrate for ease of handling, and a Rayleigh range may be on the order of a millimeter, the substrate 520 may be much less than a millimeter, for example, approximately 200 microns. Thus, the thickness of the substrate 520 is reduced to an appropriate thickness after filters 524, 528 are fabricated and prior to bonding substrate 520 to substrate 530.

Similar to system 100 in FIG. 1, system 500 includes four optical sources 512, 514, 516, 518 that emit light beams having different peak wavelengths, and the optical sources are coupled to a substrate 510. Substrates 520, 530 can transmit a high percentage of the wavelengths of the light beams emitted by the optical sources 512, 514, 516, 518. The light beam emitted by each optical source 512, 514, 516, 518 is received at a different wavelength-selective filter 522, 524, 526, 528. Each wavelength-selective filter can reflect light at a first set or group of wavelengths and transmit light at a second set or group of wavelengths. The first set of wavelengths is different from the second set of wavelengths, and each wavelength-selective filter 522, 524, 526, 528 transmits a different second set of wavelengths. Additionally, the set of wavelengths emitted by a particular optical source 512, 514, 516, 518 can be reflected by each of the wavelength-selective filters 522, 524, 526, 528 that do not transmit that particular set of emitted wavelengths.

Light beams from the three optical sources 512, 514, 516 can be focused and reflected by relay mirrors 542, 544, 546 toward the next successive wavelength-selective filter in the series of wavelength-selective filters. The relay mirrors 542, 544, 546 are coupled to substrate 540 which can also transmit a high percentage of light at the wavelengths emitted by the optical sources 512, 514, 516, 518. Thus, in example system 500, optical source 512 emits a light beam that is transmitted through substrate 520, transmitted by wavelength-selective filter 522, focused and reflected by relay mirror 542, reflected by wavelength-selective filter 524, focused and reflected by relay mirror 544, reflected by wavelength-selective filter 526, focused and reflected by relay mirror 546, reflected by wavelength-selective filter 528 and finally exits system 500 at output location 548. Note that as a light beam bounces between the relay mirrors 542, 544, 546 and the wavelength-selective filters 524, 526, 528 before exiting system 500, the light beam is transmitted with low loss multiple times through the substrates 520, 530, 540. The light beams emitted by the other optical sources 514, 516, 518 travel through the system 500 in a similar manner, and the light exiting from system 500 at output location 548 includes multiplexed light beams from the optical sources 512, 514, 516, 518.

Thus, the main difference between system 500 in FIG. 5 and system 100 shown in FIG. 1 is that in system 500, not all of the wavelength-selective filters are positioned between a first substrate 530 and a second substrate 520. In some implementations, the first substrate 520 and the second substrate 520 can be bonded directly to each other so that none of the filters are positioned between the first substrate 530 and the second substrate 520, and the filters are not co-planar.

Fabricating Bonded Filter Substrates

FIGS. 6A, 68, 6C1, 6C2, 6D1, 6D2, 6E1, and 6E2 pictorially depict steps of different fabrication techniques for fabricating bonded filter substrates having four different filters. However, these fabrication steps are applicable to substrates having any number of different types of filters. These figures will be referenced in the flow diagram descriptions of FIGS. 7 and 9A-9B below.

Fabrication Process for Bonded Filter Substrates—Bonding Substrates Prior to Dicing Substrates FIG. 7 depicts a flow diagram illustrating an example process 700 of fabricating bonded filter substrates having four different types of filters, where the substrates are bonded prior to dicing the substrates.

Figure 6A:
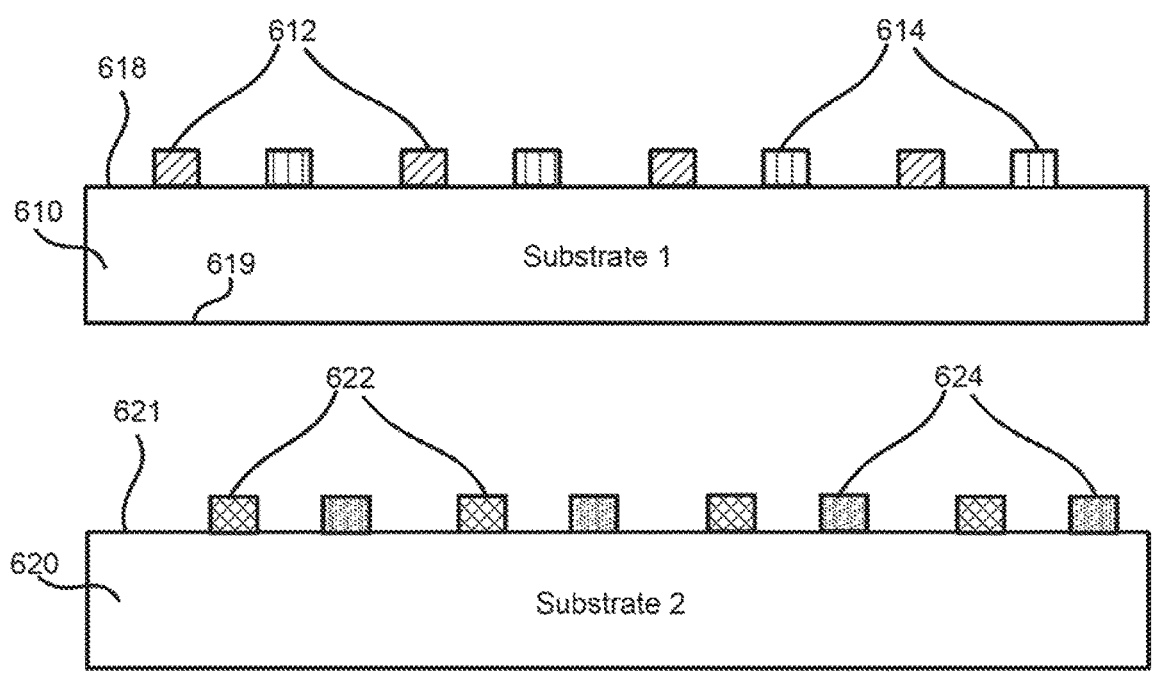

At block 705 of FIG. 7, a plurality of first filters and a plurality of second filters are fabricated on a first surface of a first substrate or wafer, where the plurality of first filters each transmit a first group of wavelengths, and the plurality of second filters each transmit a second group of wavelengths. FIG. 6A illustrates the plurality of first filters 612 and the plurality of second filters 614 fabricated on a first surface 618 of a first substrate 610.

And at block 710, a plurality of third filters and a plurality of fourth filters are fabricated on a second surface of a second substrate or wafer, where the plurality of third filters each transmit a third group of wavelengths, and the plurality of fourth filters each transmit a fourth group of wavelengths. Also, the first group of wavelengths, the second group of wavelengths, the third group of wavelengths, and the fourth group of wavelengths are different. FIG. 6A illustrates the plurality of third filters 622 and the plurality of fourth filters 624 fabricated on a second surface 621 of a second substrate 620. While in the example of FIG. 6A, two different types of filters are fabricated on each of two substrates, more or fewer different types of filters can be fabricated on each substrate, and more than two substrates can be bonded together.

Then at block 715, the first substrate is bonded to the second substrate. In some implementations, positions of the plurality of first filters, the plurality of second filters, the plurality of third filters, and the plurality of fourth filters are not stacked when the substrates are bonded. Further, in some implementations, the plurality of first filters, the plurality of second filters, the plurality of third filters, and the plurality of fourth filters can be aligned relative to each other, as shown, for example, in FIG. 1. Non-limiting examples of methods of bonding substrates include glass-to-glass bonding, adhesive bonding, oxide-to-oxide bonding, eutectic bonding, solder bonding, thermocompression bonding, and glass frit bonding.

Figure 6B:
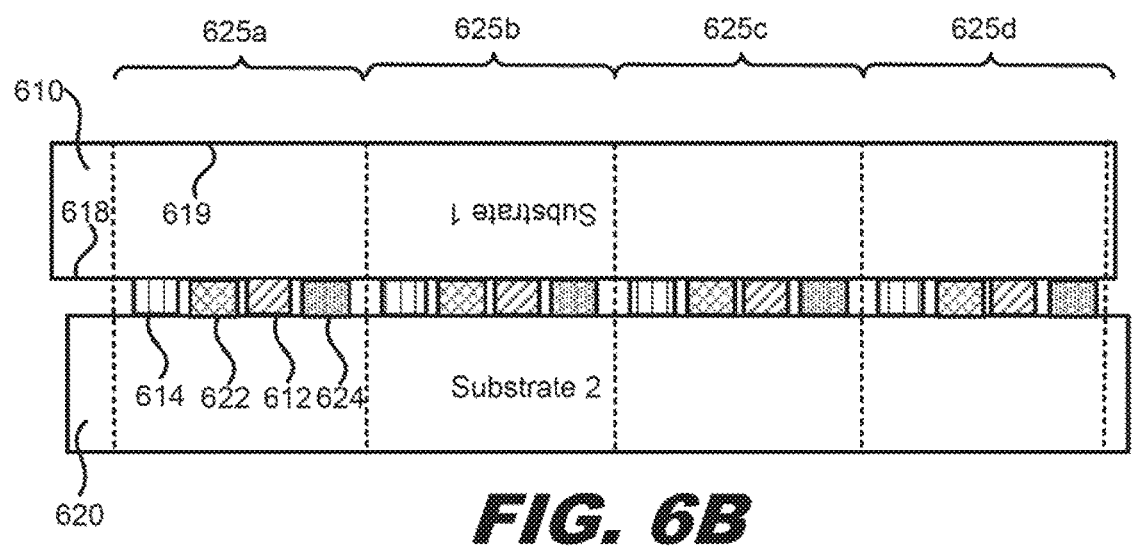

FIG. 6B illustrates an example configuration where the first surface 618 of the first substrate 1 610 on which the first filters 612 and second filters 614 are fabricated is brought close to the second substrate 2 620 so that the filters on the first surface 618 can be bonded to the second surface 621 on which the third filters 622 and fourth filters 624 are fabricated. In this case, the orientation of substrate 610 in FIG. 6B is upside down relative to its orientation in FIG. 6A. The configuration of the substrates 610, 620 shown in FIG. 6B is used to generate filter arrays for the system 100 shown in FIG. 1, where the filters are positioned between the substrates 120, 130.

FIG. 6C2 illustrates another example configuration for bonding substrates 610a, 620 to generate filter arrays for the system 500 shown in FIG. 5 where two of the filters are not positioned between the substrates 520, 530. As shown in FIG. 6A, the first substrate 610 has an opposing surface 619 that is on an opposite side of the first substrate 610 from the first surface 618 on which filters 612, 614 are fabricated. As discussed previously, the thickness of the first substrate 610 is reduced, resulting in a thinned first substrate 610a that has a new opposing surface 619a (shown in FIG. 6C1). FIG. 6C2 illustrates how the new opposing surface 619a is brought close to the second substrate 620 so that the new opposing surface 619a can be bonded to the filters on the second surface 621.

Next, at block 720, the bonded first substrate and second substrate are diced into sections that include one first filter, one second filter, one third filter, and one fourth filter. For the example configuration shown in FIG. 6B, the bonded first substrate 610 and second substrate 620 are diced along the dotted lines to produce individual filter array dies 625a, 625b, 625c, 625d, where the filters are positioned between the substrates 610, 620. For the example configuration shown in FIG. 6C2, the bonded first substrate 610a and second substrate 620 are diced along the dotted lines to produce individual filter array dies 633a, 633b, 633c, 633d, where two of the filters are not positioned between the substrates 610a, 620. In some implementations, the first substrate and/or the second substrate can be ground and/or polished prior to dicing.

Figure 8:
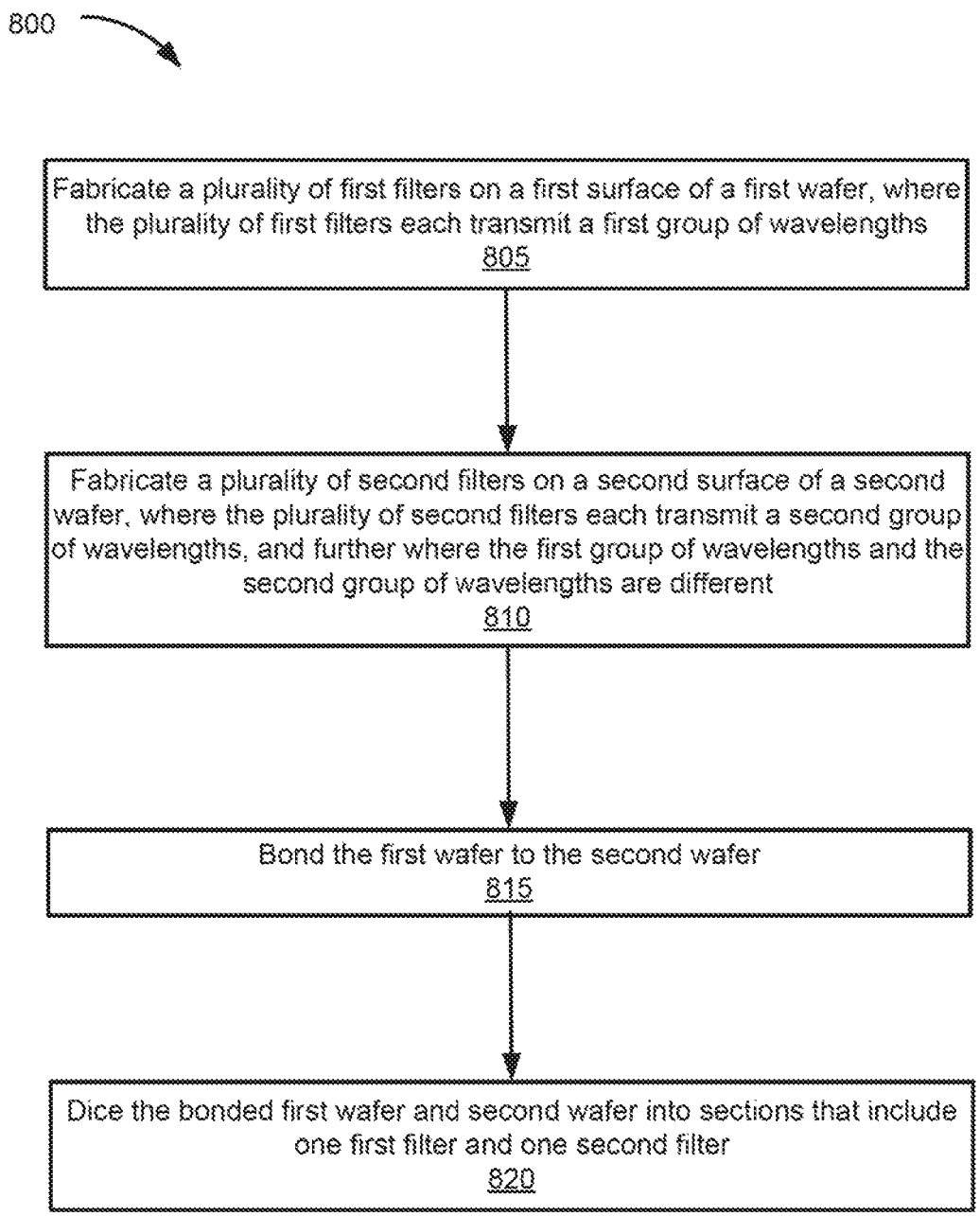
FIG. 8 depicts a flow diagram illustrating an example process of fabricating bonded filter substrates having two different types of filters, where the substrates are bonded prior to dicing the substrates.

The process 700 in FIG. 7 is applicable to the case where two different types of filters 612, 614 are fabricated on a first substrate 610, and two different types of filters 622, 624 are fabricated on a second substrate 620, as shown in the example of FIG. 6A. FIG. 8 depicts a flow diagram illustrating an example generalized process 800 of fabricating bonded filter substrates having a total of two different types of filters, where the substrates are bonded together prior to dicing.

At block 805 of FIG. 8, a plurality of first filters are fabricated on a first surface of a first substrate, where the plurality of first filters each transmit a first group of wavelengths. And at block 810, a plurality of second filters are fabricated on a second surface of a second substrate, where the plurality of second filters each transmit a second group of wavelengths. Also, the first group of wavelengths and the second group of wavelengths are different.

Then at block 815, the first substrate is bonded to the second substrate, where positions of the plurality of first filters and the plurality of second filters are not stacked. And at block 820, the bonded first substrate and second substrate are diced into sections that include one first filter and one second filter.

Figure 9B:
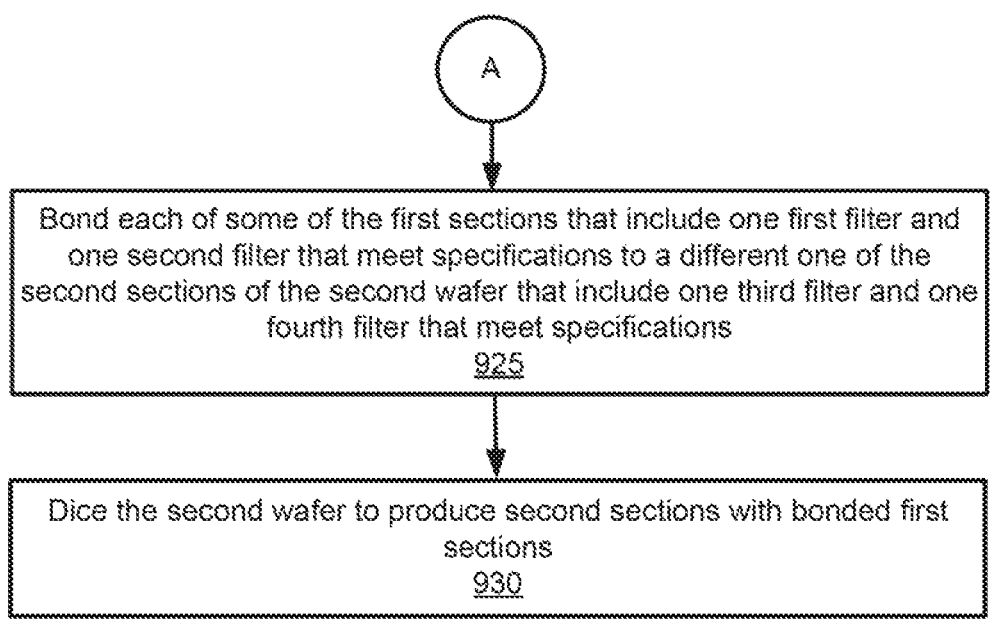

Fabrication Process for Bonded Filter Substrates—Testing Filters Prior to Bonding FIGS. 9A-9B depict a flow diagram illustrating another example process 900 of fabricating bonded filter substrates having four different types of filters, where the filters are tested prior to bonding the substrates.

At block 905, a plurality of first filters and a plurality of second filters are fabricated on a first surface of a first substrate or wafer, where the plurality of first filters each transmit a first group of wavelengths, and the plurality of second filters each transmit a second group of wavelengths.

And at block 910, a plurality of third filters and a plurality of fourth filters are fabricated on a second surface of a second substrate or wafer, where the plurality of third filters each transmit a third group of wavelengths, and the plurality of fourth filters each transmit a fourth group of wavelengths, and further where the first group of wavelengths, the second group of wavelengths, the third group of wavelengths, and the fourth group of wavelengths are different. Block 905 is similar to block 705, and block 910 is similar to block 710, thus the illustration of FIG. 6A is also applicable to blocks 905 and 910.

Further, at block 915, a determination is made of which of the plurality of first filters, the plurality of second filters, the plurality of third filters, and the plurality of fourth filters meet their respective filter specifications. The determination can be made by testing the spectral response of each of the filters.

Then at block 920, the first substrate is diced to produce first sections that include one first filter and one second filter that each meet their respective filter specifications.

Next, at block 925 each of at least some of the first sections of the first substrate that includes one first filter and one second filter that meet specifications are bonded to a different one of the second sections of the second substrate that include one third filter and one fourth filter that meet specifications. Bonding of the substrates can be performed, for example, by using one of the previously described techniques. Bonding is performed in such a way as to precisely align and maintain a specific pitch from filter to filter.

In the example of FIG. 6D1, three known good dies 610a, 610b, 610c from the first substrate 1 610 have each been tested and determined to have a first filter 612 and a second filter 614 that meet specifications. The three known good dies 610a, 610b, 610c are shown bonded to sections of substrate 2 620 that have a third filter 622 and fourth filter 624 that have been tested and determined to meet specifications. Substrate 2 620 has a section with a third filter 605 and a fourth filter 606. One or both of these filters have been determined to not meet specifications. In the case of this section with one or both bad filters that do not meet specifications, known good dies from the first substrate are not wasted by being bonded to a known bad section of substrate 2 620. This method prevents known good dies from substrate 1 from being bonded to areas on substrate 2 that do not meet specifications, and therefore, increases the yield of the filter arrays.

In the example of FIG. 6E1, there are three tested known good dies 611a, 611b, 611c, each with a first filter 612 and a second filter 614 that meet specifications. Prior to dicing the first substrate 610, the substrate 610 is thinned so that the original opposing surface 619 (shown in FIG. 6A) becomes a new opposing surface 619a. Then bonding material, such as index-matching epoxy, is placed between the new opposing surface 619a of the known good dies 611a, 611b, 611c and the second surface 629 of sections of substrate 2 that have a third filter 622 and fourth filter 624 that have been tested and determined to meet specifications. Additionally, index-matching material can be placed between one of the good third filters and/or one of the good fourth filters and the new opposing surface 619a if the good third filter and/or the good fourth filter does not contact the opposing surface.

Then at block 930, the second substrate is diced to produce second sections with bonded first sections. For the example configuration shown in FIG. 6D2, the second substrate 620 is diced to produce individual filter array dies 630a, 630b, 630c. Similarly, for the example configuration shown in FIG. 6E2, the second substrate 620 is diced to produce individual filter array dies 635a, 635b, 635c.

Figure 10:
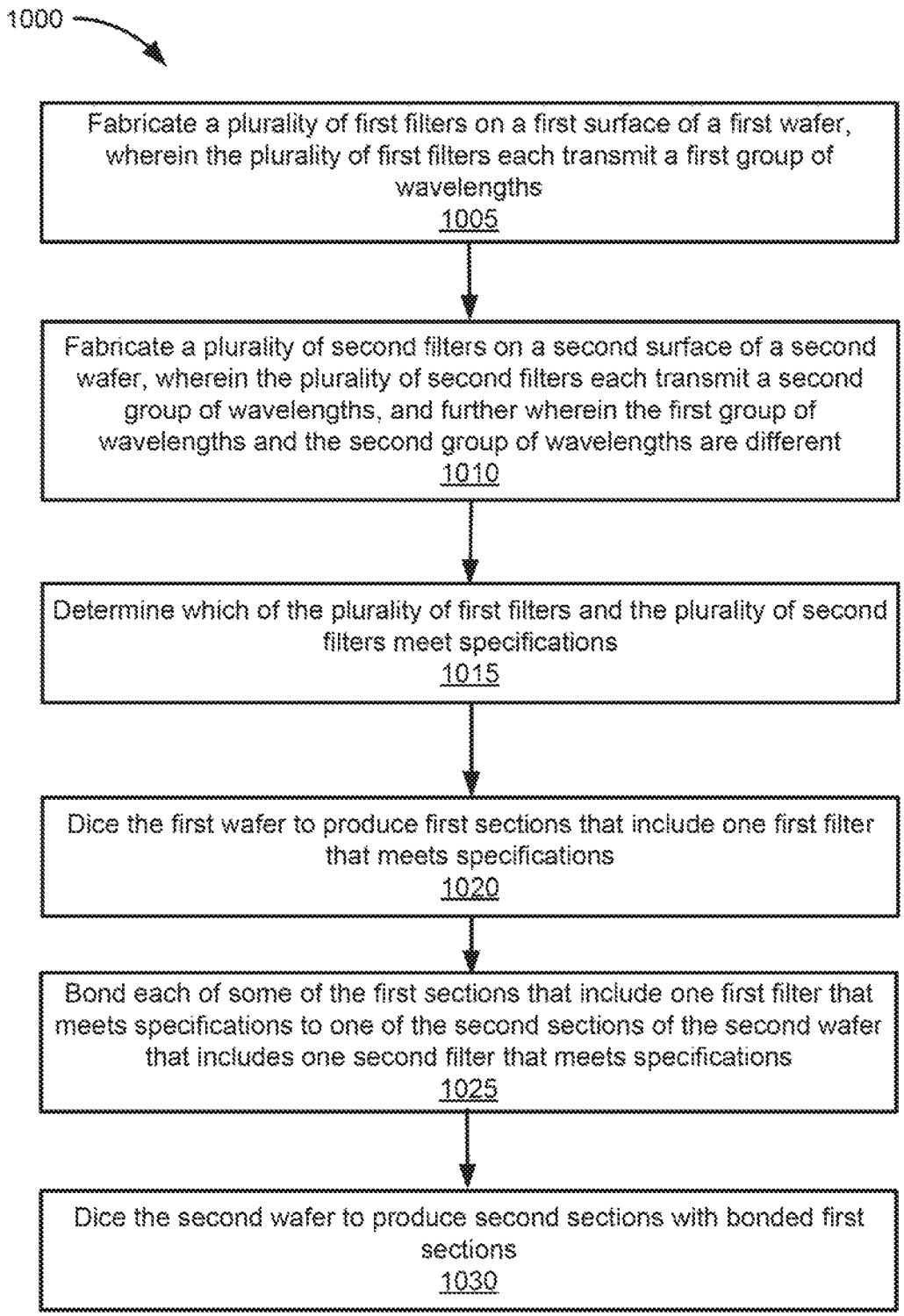
FIG. 10 depicts a flow diagram illustrating an example process of fabricating bonded filter substrates having two different types of filters, where the filters are tested prior to bonding the substrates.

The process 900 in FIG. 9 is applicable to the case where two different types of filters 612, 614 are fabricated on a first substrate 610, and two different types of filters 622, 624 are fabricated on a second substrate 620, as shown in the example of FIG. 6A. FIG. 10 depicts a flow diagram illustrating an example generalized process 1000 of fabricating bonded filter substrates having a total of two different types of filters, where the filters are tested prior to bonding the substrates.

At block 1005, a plurality of first filters are fabricated on a first surface of a first substrate, where the plurality of first filters each transmit a first group of wavelengths. And at block 1010, a plurality of second filters are fabricated on a second surface of a second substrate, where the plurality of second filters each transmit a second group of wavelengths, and further where the first group of wavelengths and the second group of wavelengths are different.

Further, at block 1015, a determination is made of which of the plurality of first filters and the plurality of second filters meet their respective filter specifications. Then at block 1020, the first substrate is diced to produce first sections that include one first filter that meets filter specifications.

Next, at block 1025 each of at least some of the first sections of the first substrate that includes one first filter that meets specifications are bonded to one of the second sections of the second substrate that includes one second filter that meets specifications.

Then at block 1030, the second substrate is diced to produce second sections with bonded first sections.

Not all of the steps or features presented above are used in each implementation of the presented techniques. Steps can be performed and features can be created in a different order than presented.

It should be noted that the above description illustrates rather than limits the examples described herein, and that those skilled in the art will be able to design alternative examples without departing from the scope of the appended claims. The word "comprising" does not exclude the presence of elements or steps other than those listed in a claim. Further, "a" or "an" does not exclude a plurality, and "a plurality" does not exclude multiple pluralities.

What is claimed is:

1. A method comprising:
   fabricating a plurality of first filters on a first surface of a first wafer, wherein the plurality of first filters each transmit a first group of wavelengths of light;
   fabricating a plurality of second filters on a second surface of a second wafer, wherein the plurality of second filters each transmit a second group of wavelengths of light, and further wherein the first group of wavelengths of light and the second group of wavelengths of light are different such that the first group of wavelengths of light configured to be transmitted through the plurality of first filters is configured to be reflected by the plurality of second filters after transmission through the plurality of first filters;
   bonding the first wafer to the second wafer, wherein the first surface is bonded to the second surface such that the plurality of first filters and the plurality of second filters are positioned between the first wafer and the second wafer;
   dicing the bonded first wafer and second wafer into sections that include one first filter and one second filter; and
   performing one of the following: minimizing thin film stress from one of the plurality of first filters and the plurality of second filters; fabricating a coating on an opposite side of the first wafer from the first surface and on an opposite side of the second wafer from the second surface; grinding one of the first wafer and the second wafer prior to fabricating filters on the ground wafer; and matching a coefficient of thermal expansion of the first wafer, the second wafer, and thin films used to create the plurality of first filters and the plurality of second filters.

2. The method of claim 1, wherein the first wafer has an opposing surface that is on an opposite side of the first wafer from the first surface, wherein the bonding material bonds the opposing surface to the second surface such that the second filter is positioned between the first wafer and the second wafer, and the first filter is not positioned between the first wafer and the second wafer.

3. The method of claim 2, further comprising reducing a thickness of the first wafer prior to bonding the first wafer to the second wafer.

4. The method of claim 2, further comprising:
placing index matching epoxy between the second surface and the opposing surface in areas not occupied by one of the filters; and
placing index matching material between the second filter and the opposing surface if the second filter does not contact the opposing surface.

5. The method of claim 1, wherein bonding the first wafer to the second wafer comprises performing a technique selected from a group comprising: direct glass-to-glass bonding, adhesive bonding, oxide-to-oxide bonding, eutectic bonding, solder bonding, thermocompression bonding, and glass frit bonding.

* * * * *